United States Patent [19]
Otsuka et al.

[11] 3,876,437
[45] Apr. 8, 1975

[54] HIGH INSULATING GLASS
[75] Inventors: Kanji Otsuka, Tokyo; Masao Sekibata, Kouhu, both of Japan
[73] Assignee: Hitachi, Ltd., Tokyo, Japan
[22] Filed: Nov. 19, 1973
[21] Appl. No.: 416,874

Related U.S. Application Data
[63] Continuation-in-part of Ser. No. 140,052, May 4, 1971, abandoned.

[30] Foreign Application Priority Data
May 4, 1970 Japan.............................. 45-37516

[52] U.S. Cl.................... 106/52; 106/48; 106/49; 106/53; 106/54
[51] Int. Cl........................... C03c 3/04; C03c 3/30
[58] Field of Search............ 106/48, 49, 52, 53, 54, 106/45, 46

[56] References Cited
UNITED STATES PATENTS
2,517,019  8/1950  Nordberg............................ 106/52
2,920,971  1/1960  Stookey............................. 106/39.6
3,436,451  4/1969  Wasser............................... 264/332
3,632,432  1/1972  Sandera.............................. 65/39

OTHER PUBLICATIONS
Volf, M. B., Technical Glasses; London, 1961, pp. 82–85, 94–95, 98–99 & 144–145.
Snell, R. G., Electrical Properties and Uses of Glass, in Glass Industry, Sept. 1962, pp. 484–489 & 530–531.

Primary Examiner—Winston A. Douglas
Assistant Examiner—Mark Bell
Attorney, Agent, or Firm—Craig & Antonelli

[57]  ABSTRACT

This invention relates to a high insulating glass wherein a conventional insulation glass comprising the basis $SiO_2$ and about 4 to about 23% of alkali metal oxides such as $Na_2O$, $K_2O$ and $Li_2O$ or alkaline earth metal oxides is mixed and remelted with 2 to 15% of powders of a material or materials which are four co-ordination number oxides such as $B_2O_3$, $Al_2O_3$, PbO and $Pb_3O_4$ and capable of dissolving into $SiO_2$ crystal and arresting alkali ions.

7 Claims, 3 Drawing Figures

HIGH INSULATING GLASS

This application is a continuation-in-part of U.S. Pat. application Ser. No. 140,052 filed May 4, 1971, now abandoned.

This invention relates to an insulating glass for semiconductor packages.

Generally, such glass is firmly bonded with a metal or ceramic. Therefore, the glass must have relatively the same thermal expansion coefficient as the metal or ceramic, and the working temperature of the glass must be lower than the melting point of the metal. Furthermore, the glass must have sufficient wettability with respect to the metal and ceramic.

It is well known that ordinary $SiO_2$ glass contains 4 to 20% of such oxides as $Na_2O$, $K_2O$, $LiO_2$, etc., to meet the foregoing requirements.

Nowadays, borosilicate glass is widely used for coating materials having a relatively low thermal expansion coefficient (40 to $7 \times 10^{-7}/°C.$), such as, Kovar (Fe-Ni-Co alloy), Mo, Fe-Ni, ceramic consisting mainly of $Al_2O_3$ or of BeO, etc.; and lead glass, soda lime glass and barium alkali glass are used for coating materials having a relatively high thermal expansion coefficient, such as, Dumet wire (Fe-Ni wire coated with Cu), Fe-Ni alloy (52% Ni), Fe-Cr alloy, Fe, forsterite-ceramic ($2MgO$, $SiO_2$), spinel ($Al_2O_3$, MgO), etc.

The approximate compositions of typical glasses now on the market are shown in Table 1.

Table 1

| Glass Type | Corning Co. code No. | Composition (% by weight) | | | | | | | | |
|---|---|---|---|---|---|---|---|---|---|---|
| | | $SiO_2$ | $B_2O_3$ | $Al_2O_3$ | CaO | MgO | BaO | PbO | $Na_2O$ | $K_2O$ |
| Soda lime glass | 0080 | 72.5 | — | 4.7 | 7.0 | 2.3 | — | | 11.5 | 2.1 |
| Lead glass | 0120 | 57.5 | — | 1.2 | 0.8 | 0.1 | — | 28.6 | 5.8 | 6.0 |
| Barium alkali glass | 9010 | 64.4 | — | 4.4 | 0.2 | 0.1 | 12.7 | $Sb_2O_3$ (0.5) | 7.2 | 9.3 |
| Borosilicate glass | 7052 | 64.9 | 18.0 | 8.4 | 0.2 | — | 3.1 | | 1.9 | 3.9 |

Since all these glasses contain alkali metal oxides such as $Na_2O$, $K_2O$, etc. and alkaline earth metal oxides such as CaO, MgO, etc., the following problems exist:

For example, FIG. 1 shows a stem for a semiconductor device in which the metal leads 2 spaced apart about 2 mm., are inserted into a ring-shape stem header 1 and fusion bonded thereto by glass 3. The fusion bonding between the glass and the metal leads is carried out at about 1,000°C., the metal portions are tin plated to a thickness of about $5\mu$ for rust prevention, and the unit thereafter rinsed by ion pure water and dried. After about 4 hours, the insulation resistance between the metal leads is measured. This measurement is carried out under the conditions of an applied voltage of 5 to 100VDC, a temperature of 25°C., and a humidity of 50%RH. This stem is then exposed for 500 hours to a high temperature and high humidity atmosphere, for example, an atmosphere at 80°C. and 90% RH, and air cooled after removal from this atmosphere. After about 4 hours, the measurement is repeated at the same conditions after the stem is re-rinsed in ion pure water, the insulation resistance is again measured at the same conditions. The results of these measurements are indicated in Table 2.

Table 2

| Corning Co. code No. | Initial Resistance (ohms) | Resistance under 80°C. 90% RH, 500 hrs. (ohms) | Resistance after re-rinsing (ohms) |
|---|---|---|---|
| 0080 | $10^{11}$ | $10^7$ | $10^{10}$ |
| 9010 | $10^{12}$ | $10^8$ | $10^{11}$ |
| 7052 | $10^{13}$ | $10^9$ | $10^{12}$ |
| 0120 | $10^{13}$ | $10^9$ | $10^{12}$ |

As clearly indicated in the above table, the insulation resistance between the leads deteriorates by about four orders magnitude at the condition of high temperature and high humidity and the insulation thus deteriorated can be improved by a sufficient rinsing in ion pure water. This indicates that the deterioration of the insulation is caused to take place only at the surface portion of the glass.

The condition of 80°C., 90% RH and 500 hours employed above is an accelerated simultation of an environmental condition to which the semiconductor may be exposed during its actual employment, thereby indicating the possibility of the actual occurrence of the deterioration produced above.

Since in transistors and IC's of high impedance, particularly field-effect transistors, MOSIC's etc., a leak current in the order of $10^{-10}$ A. causes a critical problem, it is clear that a resistance of $10^7\Omega$ to $10^9\Omega$ is not adaptable as the insulation for such applications. As described above, in case of the conventional insulating glass, it is obvious that there exists a relation between the content of alkali components and the deterioration of insulation resistance. This phenomenon can be explained that the alkali components of the glass surface are liberated by water to form NaOH and KOH, whereby leading to the reduction of the insulation resistance of the glass.

The ionic bonding of such alkali ions is stronger than that of the other oxides. Of these ions, particularly an ion such as $Na^+$ having a small ionic radius, due to its low strength to bond with oxygen (about 20Kcal for Na), has a tendency to move relatively freely in the glass even at room temperature.

In view of the above points, the present invention is directed to an improvement of the conventional insulating glass, and it is therefore an object of the invention to provide an insulating glass having a proper thermal expansion coefficient, working temperature, and adhesion strength, and in which the liberation of alkalis at the surface portion can be prevented and the diffusion of alkali ions from the interior can be suppressed thereby enabling the retention of high insulation resistance upon use under a high temperature and high humidity environment.

Thus this invention contemplates an improved high insulation glass which comprises a $SiO_2$ based insulation glass containing 4 to 23% by weight of alkali metal compounds such as $Na_2O$, $K_2O$, $Li_2O$, $Pb_2O$, and $Cs_2O$ or alkaline earth metal oxides admixed and remelted with 2 to 15% by weight of powders of a material comprising at least one four coordination number oxide such as $B_2O_3$, $Al_2O_3$, PbO and $Pb_3O_4$ that is capable of dissolving into the $SiO_2$ crystal and of arresting alkali ions.

The invention will be further understood by the following detailed description of its embodiments and by the accompanying drawings in which.

The present invention is based on the following theoretical consideration and belief:

In a glass based on $SiO_2$, the introduction of $Na_2O$ into the glass penetrates the network of $SiO_2$ crystal so that $Na^+$ is ionically bonded with the $-O$ radical. If it is assumed that this bonding strength is weak and that the cutting or penetration of the network produces a weak glass structure thereby causing the problems described above, it is reasonable to aim at obtaining a structure having a network which can not be cut or penetrated by the introduction of $Na_2O$. In this regard, when an element having a valency of three and an oxygen coordination number of four, for example, an oxide of boron, is introduced into the glass, the desired condition noted above is believed to exist. This phenomenon is indicated in the following structural groupings:

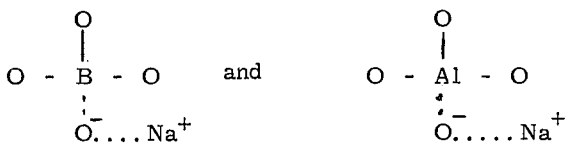

wherein the four coordinated oxygen atoms do not cut the network and one negative valency is excessive, whereby the $Na^+$ is arrested to form an ionic bonding. Thus, the stability of the glass can be attained and the diffusion and liberation of $Na^+$ is prevented. This ionic bonding has already been described by Warren and Biscoe (*Journal of American Ceramic Society*, Vol. 24, p 256, 1941). This principle also can be applied to aluminum which also has a valency of three and an oxygen coordination number of four. The most stable formation or structure consists of the form $XY_4$, X representing $BO_4$ and $AlO_4$ coordinations and Y representing $BO_3$ and $AlO_3$ coordinations wherein X is necessarily attached with $Na^+$ or $K^+$, that is, the content of $Na_2O$ or $K_2O$ is 16.7 mol%. $SiO_2$ increased is substituted by X and the decreasing X induces the decrease of $Na_2O$, thereby leading to a stable condition.

However, a glass which may be provided with only the above stability condition does not meet all of the necessary conditions such as coefficient of thermal expansion, etc. and is not practicable.

The present invention is directed to a process for rendering the above theory of stabilization feasible and contemplates a glass composition wherein a conventional insulation glass comprising a $SiO_2$ base and about 4 to about 23% by weight of alkali metal oxides such as $Na_2O$, $K_2O$, $Li_2O$, $Pb_2O$ and $Cs_2O$ or alkaline earth metal oxides is mixed and remelted with about 2 to about 15% by weight of powders of a material (or materials) which are four coordination number oxides such as $B_2O_3$, $Al_2O_3$, PbO and $Pb_3O_4$, and capable of dissolving into the $SiO_2$ crystal and arresting the alkali metal ions.

Figure 1:
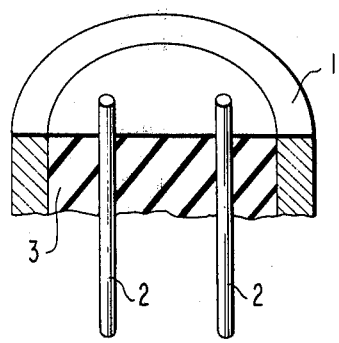
FIG. 1 is a perspective view in longitudinal section of a semiconductor stem in which the glass according to the present invention may be incorporated.
Figure 2:
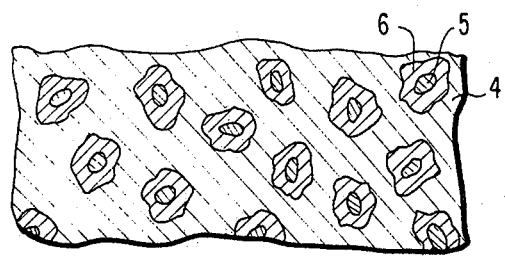
FIG. 2 is an enlarged cross-sectional view of a fundamental structure of the glass according to the present invention.

A glass produced into a desired shape by pressing and sintering a mixture of powders of a conventional insulation glass and the oxides of metals having an oxygen coordination number of four as described above is fused to form a stem of the type shown in FIG. 1. FIG. 2 indicates schematically the structure at this state, wherein reference numeral 4 designates the $SiO_2$ based glass and reference numeral 5 the added oxides. At least one portion of the added oxides is dissolved into the $SiO_2$ based glass forming dissolved or mixed layers or regions 6 which are highly stable by comprising $XY_4$ type formation described above. The mixed layers or regions, which are the dissolved mixture of $SiO_2$ based glass and the added oxides, are suspended throughout the glass structure as shown in FIG. 2. Accordingly, the alkali ions in the mixed layer can not easily move or liberate on the surface. The thickness or extent of the mixed layer or region can be controlled by varying the heat treatment conditions such as the melting temperature and time; and the mixing amount and grain size of four coordination number oxides; and by forming the two dimensional continuity. The mixed layer can sufficiently prevent the liberation and movement of alkali ions remaining on the surface under the application of electric field.

Upon the formation of such mixed layer, the characteristics of the glass per se vary. Each element of the characteristics will be analyzed as follows:

1. Working temperature

The lowering of the working temperature does not cause any problem. Even in the case of an enhanced working temperature, the fluidity of the original glass is utilized so that the desired shape can be easily attained even when solidified at the last step of heat treatment, i.e., during a remelting step.

$Pb_3O_4$ has the same tendency as PbO. When dissolved into the glass, however, $Pb_3O_4$ is changed into PbO. As a result, the freed or access oxygen exists in the glass as oxygen ions or, as a bubble. However, the access oxygen does not affect the fluidity of the glass.

2. Coefficient of thermal expansion ($\alpha$)

a. $B_2O_3$ — this oxide has a large $\alpha$ of $150 \times 10^{-7}/°C.$, but when dissolved into a glass based on $SiO_2$ (especially in case of $XY_4$ type), the mixed layer including it has a smaller $\alpha$ than that of the original glass, whereby resulting in no change of $\alpha$ due to the compensation therebetween.

b. $Al_2O_3$ — this oxide has an intermediate $\alpha$ of the general coefficients of thermal expansion of glass (65

$\times 10^{-7}/°C.,$) and, therefore, does not usually cause any significant change of $\alpha$ when dissolved.

c. PbO — since this oxide also has a large $\alpha$ of about $150 \times 10^{-7}/°C.$ and increases $\alpha$ even when dissolved, it should be used with a glass having a relatively small $\alpha$ to provide a desired $\alpha$ after remelting.

d. $Pb_3O_4$ — this oxide has the same tendency as PbO. Also, this is not affected by the excess oxygen.

3. Strength

Although $B_2O_3$ itself is relatively low in strength, the strength of the glass of $XY_4$ type is high and $B_2O_3$ — mixed layer — glass constitutes a continuous structure and thereby produces no strain and no significant strength change.

$Al_2O_3$ itself is strong and contributes to the strengthening of the $XY_4$ type glass, whereby further slightly increasing the strength as a whole.

PbO has the same tendency as $B_2O_3$.

Although $Pb_3O_4$ has the same glass structure as PbO, the strength is relatively low due to the excess oxygen.

4. Chemical resistance $B_2O_3$ and PbO each have a low chemical resistance but a high resistance in the dissolved state thereof and are oxides having an excellent wettability with respect to glass and also not exposing on the glass surface whereby resisting the action of chemicals and the deterioration.

$Al_2O_3$ per se is more stable than the glass and also maintains its stability when dissolved, whereby tending to enhance the chemical resistance of the original glass.

$Pb_3O_4$ has the same tendency as PbO.

5. Thermal conductivity

The thermal conductivity is improved in all cases.

EXAMPLE I

Corning Co. No. 0080 glass ($SiO_2$ based glass) described above is ground to produce fine powders of 150 mesh. To this glass is added 10% by weight (based on the wieght of the glass) of boric anhydride powders sufficiently dehydrated and having a grain size of 150 mesh. The glass and anhydride are mixed in an alumina-type ball mill for 10 hours, and thereafter the mixture thus produced is granulated by an ordinary method such as speed milling, spray drying, and the like. After adding a conventional binder such as acrylic resin, this granulated mixture is formed to a desired shape by a powder pressing machine.

Figure 3:
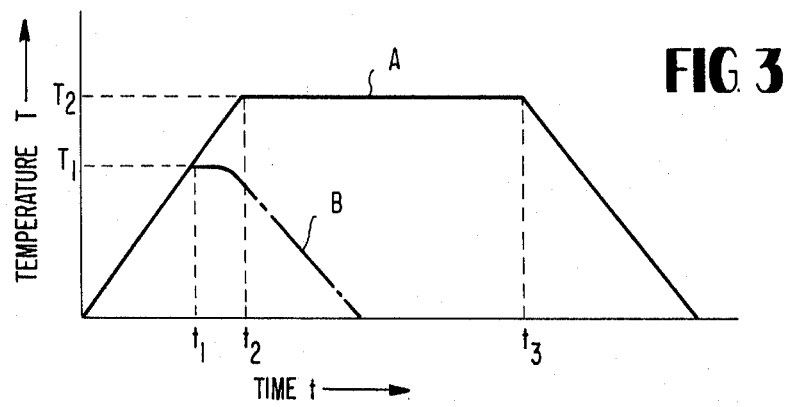
FIG. 3 is a graphic diagram showing a relationship between the temperature and time of heat treatment practiced in the manufacturing process of the glass according to the present invention.

The press formed product is gradually heated to a temperature of 750°C. and after holding it at the temperature for 1 minute, is removed to obtain a sintered product. This product, and the header ring and metal leads shown in FIG. 1 are assembled on a carbon fixture and heated and remelted at a temperature of 950° to 1,050°C. for 5 to 30 minutes under a nitrogen or other suitable inert atmosphere, followed by cooling to room temperature at a rate of 10° to 50°C./minute. FIG. 3 is a graphic diagram showing a relationship between the temperature and time in the heat treatment.

The abscissa indicates temperature T and the ordinate indicates time $t$. In treatment A, during the time between $t_2$ and $t_3$ the temperature is kept at a constant value $T_2$. After time $t_3$, the temperature is gradually decreased to room temperature.

The temperature $T_2$ is selected such a value that the added oxides dissolve. The added oxides e.g. $B_2O_3$, are gradually dissolved into the insulation glass, i.e. $SiO_2$ based glass, during the time $t_2$ to $t_3$. As a result, the glass structures, as shown in FIG. 2 are formed.

At a certain temperature below $T_2$, the $SiO_2$ based glass itself melts easily. However, the added oxides hardly melt. As a result, the added oxides, keeping a powder state, do not dissolve into the $SiO_2$ based glass and therefore the glass structures as shown in FIG. 2 are not formed.

The rate of dissolution of added oxides depends on the period of time $t_2$ to $t_3$ and the temperature. In case of FIG. 3, the rate is determined according to the period of time $t_2$ to $t_3$. Therefore the added oxides may be completely dissolved into the $SiO_2$ based glass by choosing a sufficient period of time. It will be appreciated that all of the added oxide need not be dissolved and that even a partially formed mixed layer tends to prevent migration of the alkali metal ions.

The heat treatment B at temperature $T_1$ is for sintering the $SiO_2$ based glass with added oxides, and is done prior to the heat treatment A.

The heat treatment B is done for making an assembly of the stem easy. Without sintering, it is difficult to apply the glass in a powder state to the assembly work.

The temperature in this heat treatment B is selected to a value being lower than that in the treatment A and therefore the dissolved or mixed layer is not substantially formed at this heat treatment.

For the purpose of rust prevention, the stem sample thus produced, is tin plated on the metal parts thereof, such as the header ring and leads, to a thickness of about $5\mu$ and then sufficiently rinsed by ion pure water and dried. After 4 hours, the insulation resistance between the metal leads is measured. The measurement is performed under the conditions of an applied voltage of 5 to 100VDC, a temperature of 25°C. and a relative humidity of 50%RH. This stem is then exposed to a high temperature and high humidity atmosphere (for example, of 80°C. and 90%RH, for 500 hours) and after the removal and cooling thereof and after a period of 4 hours, the measurement is performed under the same conditions heretofore noted.

The results of above measurements are indicated in Table 3.

Table 3

|  | Initial resistance | Resistance after 80°C., 90% RH, 500 hrs. |
|---|---|---|
| Corning Co. No. 0080 glass mixed with $B_2O_3$ 10% | $10^{12}\Omega$ | $10^{12}\Omega$ |

It has been found that other characteristics also can satisfactorily withstand the conditions under which the stem is used.

EXAMPLE II

According to the procedure of Example I, 5% by weight of PbO (150 mesh) is mixed with the glass and the similar tests are carried out, the results of which are indicated in Table 4.

Table 7

|  | Initial resistance | Resistance after 80°C., 90%RH, 500 hrs. |
|---|---|---|
| Corning Co. No. 7052 mixed with $B_2O_3$ 5% $Al_2O_3$ 2% | $10^{13}$ Ω | $10^{12}$ Ω |

Table 4

|  | Initial resistance | Resistance after 80°C., 90%RH, 500 hrs. |
|---|---|---|
| Corning Co. No. 0080 glass mixed with PbO 5% | $10^{11}$ Ω | $10^{10}$ $10^{11}$ Ω |

EXAMPLE III

In this example the procedure used in Example I is again followed wherein 10% by weight of $Al_2O_3$ and 5% by weight of PbO are mixed with the glass and the similar tests are carried out; the results of which are indicated in Table 5.

Table 5

|  | Initial resistance | Resistance after 80°C., 90% RH, 500 hrs. |
|---|---|---|
| Corning Co. No. 0080 glass mixed with 10% $Al_2O_3$ and 5% PbO | $10^{11}$ Ω | $10^{11}$ Ω |

Moreover, while the insulation resistance does not change, compared to the case of $Al_2O_3$ alone, the enhancement of viscosity is prevented as $Al_2O_3$ dissolves in the glass, thereby resulting in a highly workable glass.

EXAMPLE IV

In this example, using the procedure of Example I, 1% by weight of $B_2O_3$ (325 mesh) and 1% by weight of PbO (325 mesh) are mixed with the glass and the mixture produced is heated for a sufficient period of time to completely dissolve the two into the glass (1,050°C. 30 minutes). The results of the insulation tests are indicated in Table 6.

Table 6

|  | Initial Resistance | Resistance after 80°C., 90%RH, 500 hrs. |
|---|---|---|
| Corning Co. No. 0080 glass mixed with $B_2O_3$ 1% PbO 1% | $10^{11}$ Ω | $10^{11}$ Ω |

EXAMPLE V

This example further illustrates the glass composition of this invention. In this case, 5% by weight of $B_2O_3$ and 2% by weight of $Al_2O_3$ are mixed with Corning Co. No. 7052 glass (borosilicate glass) formed into the desired glass following the procedures of Example I and then tested. The test results obtained are indicated in Table 7.

According to this example it has also been found that use of $Al_2O_3$ reduces the variation of the thermal expansion coefficient and also prevents lowering of strength.

EXAMPLE VI

5% by weight of $Al_2O_3$ is mixed with Corning Co. No. 0120 glass (lead glass) in this case. The results obtained are indicated in Table 8. In this case, it is necessary to keep the remelting atmosphere of the nitrogen or other suitable inert atmosphere from mixing with such the reducing atmosphere as a hydrogen or carbon monoxide since PbO in 0120 glass is easy to black color by reducing the atmosphere. Also, in case of use a carbon jig, it is desirable not to introduce an oxygen into the inert atmosphere since CO is easy to form by reacting with carbon.

Table 8

|  | Initial resistance | Resistance after 80°C., 90%RH 500 hrs. |
|---|---|---|
| Corning Co. No. 0120 glass mixed with $Al_2O_3$ 5% | $10^{13}$ Ω | $10^{11}$ Ω |

EXAMPLE VII

In this example, 3% by weight of $Al_2O_3$ and 2% by weight of $Pb_3O_4$ are mixed with Corning Co. No. 0120 glass. By using $Al_2O_3$ together with $Pb_3O_4$, more stable glass can be obtained. The results are indicated in Table 9.

Table 9

|  | Initial resistance | Resistance after 80°C, 90% RH, 500 hrs. |
|---|---|---|
| Corning Co. No. 0120 glass mixed with $Al_2O_3$ 5% and $Pb_3O_4$ 2% | $10^{13}\Omega$ | $10^{11}\Omega$ |

The glass structures produced in the above-mentioned examples include the dissolved or mixed layers or regions which trap or catch the alkali ions and therefore the alkali ions do not easily move or liberate on the surface of the glass structures. The diffusion of alkali ions in the interior part of the glass can also be suppressed, thereby enabling the retention of high resistance upon use of the glass under a high temperature and high humidity environment.

In accordance with the present invention the insulating glass having a high insulation resistance can be obtained without re-rinsing the product after exposure to the high temperature and high humidity atmosphere.

That is, according to the present invention, without needing an extra process high insulating glasses can be obtained.

While the novel principles of the invention have been described, it will be understood that various omissions, modifications and changes in these principles may be made by one skilled in the art without departing from the spirit and scope of the invention.

What is claimed is:

1. An electrically insulating glass structure which consists essentially of a conventional insulation glass based on $SiO_2$ and containing about 4 to about 23% by weight of alkali metal oxides, or alkaline earth metal oxides and about 2 to 15% by weight of powdered oxides selected from the group consisting of $B_2O_3$, $Al_2O_3$, PbO, $Pb_3O_4$ and mixtures thereof, said powdered oxides being uniformly suspended throughout said insulation glass and at least one part of each of said powdered oxides being dissolved into said insulation glass forming dissolved regions which are highly stable whereby the alkali ions in the dissolved regions are arrested and prevented from being liberated at the surface of said glass structure.

2. The high insulating glass of claim 1 in which the alkali metal oxides include $Na_2O$, $K_2O$, $Li_2O$, $Rb_2O$, and $Cs_2O$.

3. The insulating glass of claim 1 in which the alkali metal oxides are selected from the group consisting of sodium, potassium and lithium and mixtures thereof.

4. An electrically insulating glass structure for semiconductor packages consisting essentially of the melt of a conventional $SiO_2$ based insulation glass containing about 4 to 23% by weight of alkali metal oxides or alkaline earth metal oxides and from about 2 to 15% by weight of at least one powdered oxide selected from the group consisting of $B_2O_3$, $Al_2O_3$, PbO and $Pb_3O_4$, said powdered oxide being suspended uniformly throughout said insulation glass and at least one part of said powdered oxide being dissolved within said insulation glass, forming dissolved regions which are highly stable and capable of arresting alkali ions.

5. The insulating glass of claim 4 in which the alkali metal oxides are selected from the group consisting of $Na_2O$, $K_2O$, $Li_2O$, $Rb_2O$ and $Cs_2O$ and mixtures thereof.

6. An insulating glass structure consisting essentially of 2 to 15% by weight of particles of oxides selected from the group consisting of $B_2O_3$, $Al_2O_3$, PbO, $Pb_3O_4$ and mixtures thereof, and a remelted glass comprising mainly $SiO_2$ and containing alkali metal oxides or alkaline earth metal oxides by 4 to 23 weight percent, said remelted glass surrounding said particles in which said particles are partially dissolved, the dissolved particles being highly stable whereby alkali ions are arrested therein.

7. The glass structure of claim 6 wherein said particles of oxides are selected from the group consisting of (a) 10% by weight of $B_2O_3$, (b) 5% by weight of PbO, (c) 10% by weight of $Al_2O_3$ and 5% by weight of PbO, (d) 1% by weight of $B_2O_3$ and 1% by weight of PbO, (e) 5% by weight of $B_2O_3$ and 2% by weight of $Al_2O_3$, (f) 5% by weight of $Al_2O_3$, and (g) 5% by weight of $Al_2O_3$ and 2% by weight of $Pb_3O_4$.

* * * * *